United States Patent
Dimeff

[11] Patent Number: 6,164,142
[45] Date of Patent: Dec. 26, 2000

[54] AIR FLOW MEASUREMENT DEVICE

[76] Inventor: John Dimeff, 5346 Greenside Dr., San Jose, Calif. 95127

[21] Appl. No.: 09/183,722

[22] Filed: Oct. 30, 1998

Related U.S. Application Data

[60] Provisional application No. 60/063,786, Oct. 31, 1997.

[51] Int. Cl.[7] .................................................. G01F 1/42
[52] U.S. Cl. ........................ 73/861.61; 73/861.52; 600/538
[58] Field of Search ...................... 73/861.61, 861.52; 600/529, 538

[56] References Cited

U.S. PATENT DOCUMENTS

| | | | |
|---|---|---|---|
| 2,929,248 | 3/1960 | Sprenkle | 73/198 |
| 3,071,160 | 1/1963 | Weichbrod . | |
| 3,129,587 | 4/1964 | Hallanger . | |
| 3,504,542 | 4/1970 | Blevins . | |
| 3,600,945 | 8/1971 | Wenzel | 73/861.52 |
| 3,626,755 | 12/1971 | Rudolph . | |
| 3,797,479 | 3/1974 | Graham . | |
| 3,838,598 | 10/1974 | Tomkins . | |
| 3,840,051 | 10/1974 | Akashi et al. | 138/37 |
| 4,040,293 | 8/1977 | Wilson | 73/861.61 |
| 4,380,936 | 4/1983 | Van Scoy | 73/861.62 |
| 5,357,972 | 10/1994 | Norlien . | |
| 5,461,932 | 10/1995 | Hall et al. | 73/861.61 |
| 5,722,417 | 3/1998 | Garbe . | |
| 5,980,466 | 11/1999 | Thomson | 600/538 |
| 6,053,055 | 4/2000 | Nelson | 73/861.52 |

*Primary Examiner*—Hashad Patel
*Attorney, Agent, or Firm*—Robert S. Kelly

[57] ABSTRACT

An air flow measurement device includes a connector conduit for the air flow having a transverse restrictor plate located therein with a plurality of uniform and uniformly spaced apertures extending therethrough. The restrictor plate is maintained in the connector conduit by a pair of sleeves each of which includes on its interior diameter a plurality of angularly spaced passages and on its outer diameter a circumferential groove communicating with the passages. A pair of valves are mounted through the wall of the connector conduit for communication with the circumferential grooves so that a differential pressure meter may be connected to the valves to measure the difference in pressure upstream and downstream of the restrictor plate to thereby determine the flow rate. The sleeves may be made in two identical pieces to form the passages and grooves, and additional smoothing screens may be positioned upstream and downstream of the restrictor plate by further identical sleeve pieces.

12 Claims, 2 Drawing Sheets

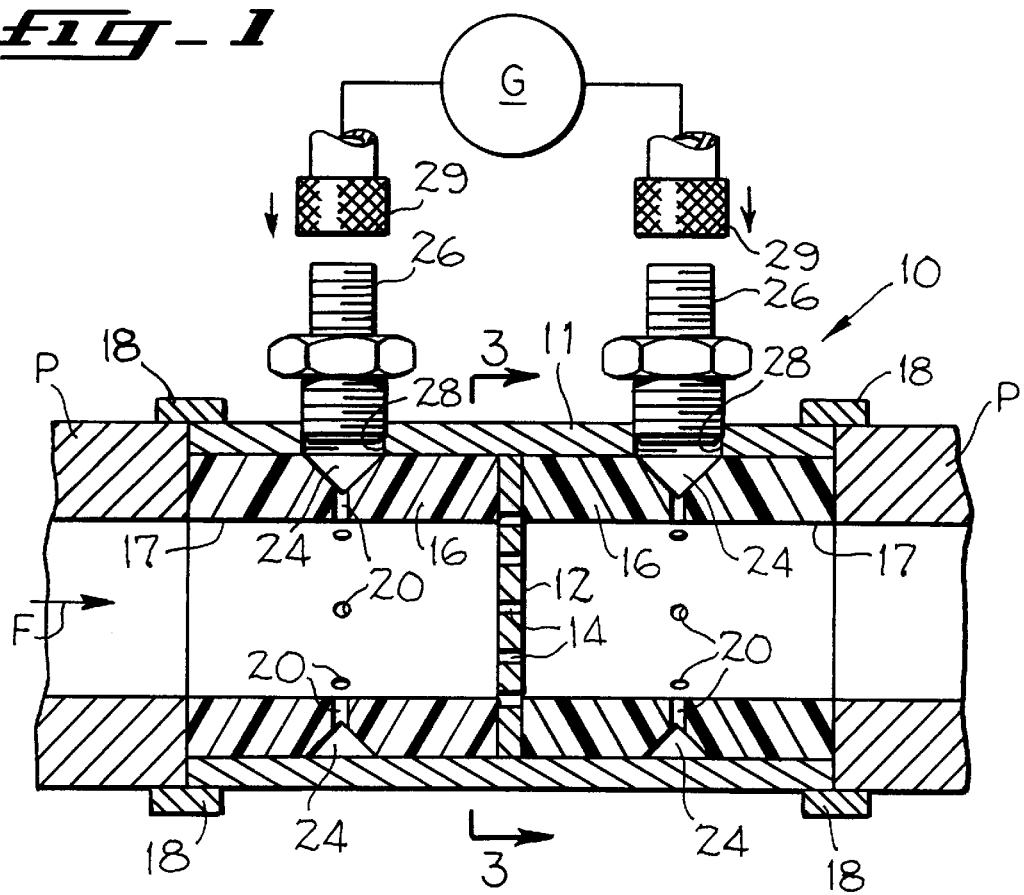
fig_1
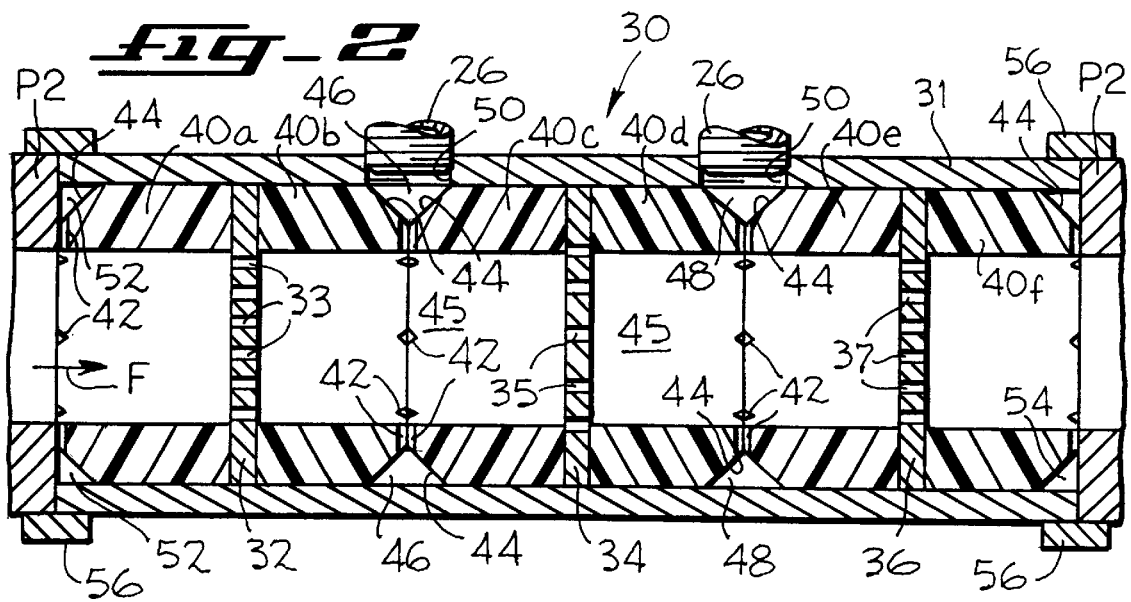
fig_2

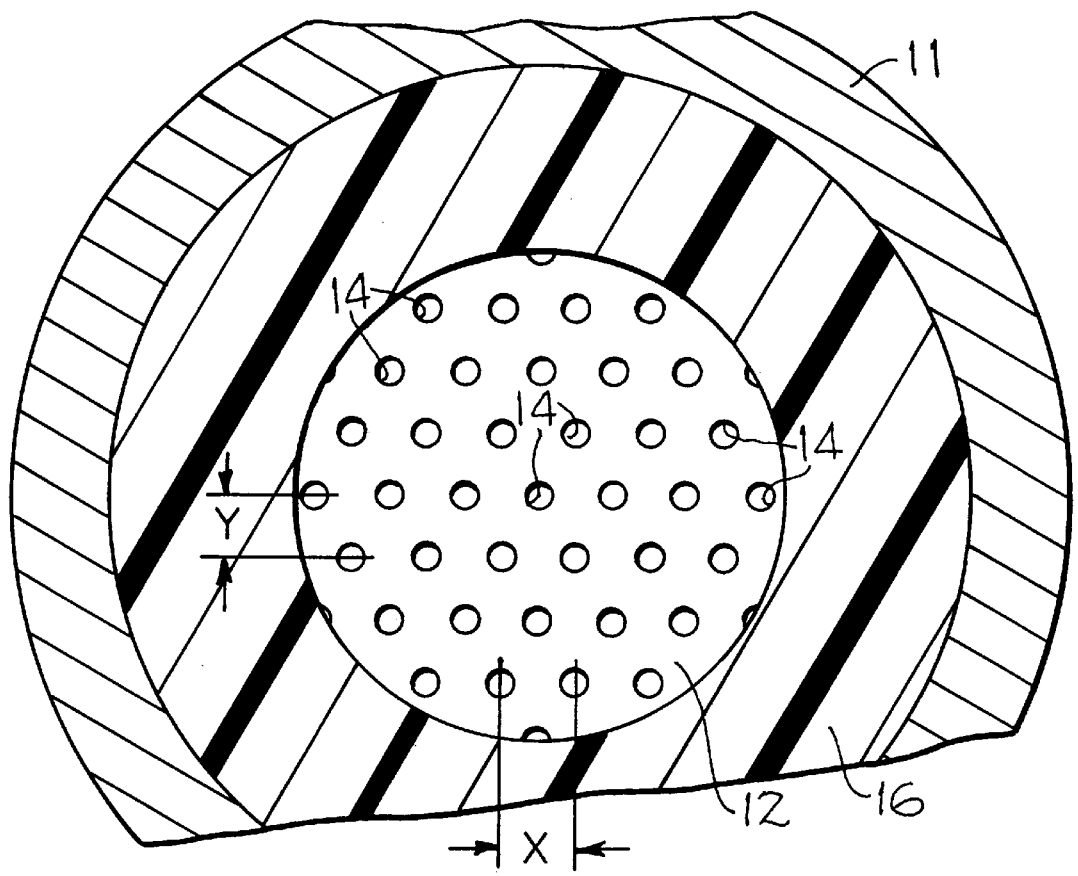
fig_3
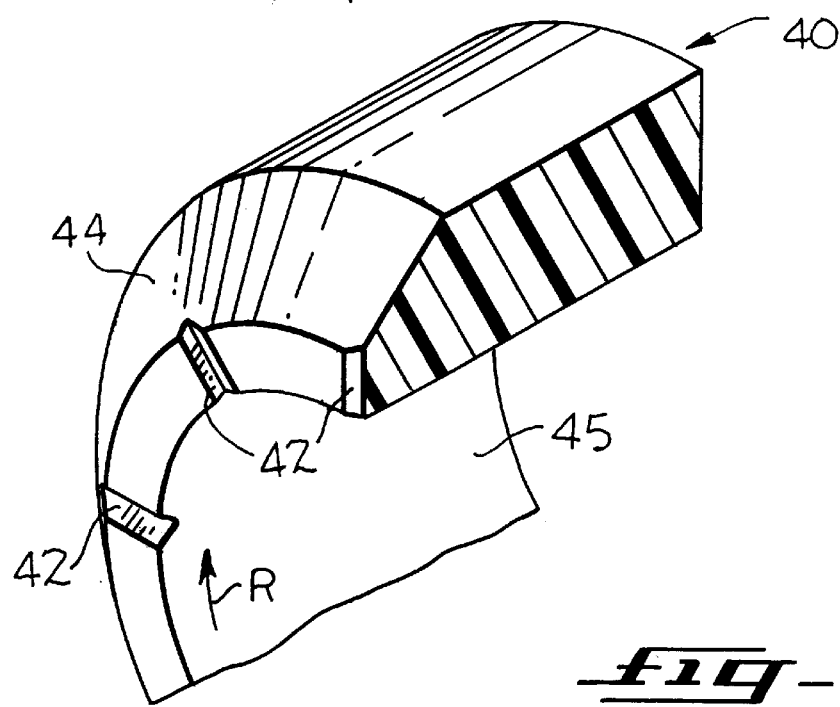
fig_4

AIR FLOW MEASUREMENT DEVICE

REFERENCE TO PRIOR APPLICATION

This application claims the benefit of U.S. Provisional Application No. 60/063,786, filed Oct. 31, 1997 and entitled: HYBRID PRIMARY DEVICE FOR HEAD FLOWMETERS.

BACKGROUND OF THE INVENTION

1. Field of the Invention

The present invention pertains to devices for measuring the air or gas flow rates through conduits especially at low flow rates, and more particularly, it pertains to head flowmeters or air flow measuring devices of the type which present a restricted orifice or a plurality of restricted orifices to the air flow and measure the pressure drop thereacross in order to determine the flow rate.

2. Description of the Prior Art

In head flowmeters, a device designed to introduce a slight resistance to the flow of air or gas is placed within the conduit through which the air is flowing. The difference between the pressures appearing at the wall of the conduit sections upstream and downstream of the flow impeding device is measured, and the magnitude of that pressure difference is directly utilized to determine the amount of air (in standard cubic feet per hour, SCFH, for example) flowing through the conduit (i.e., the greater the pressure differential, the greater the flow). In its simplest form, the flow impeding device is a thin plate mounted perpendicularly to the axis of the pipe, in such a manner as to prevent the flow of air except such air as may flow through an orifice machined in the plate and located on the centerline of the conduit.

Air flow measuring devices of this type respond in accordance with the law of conservation of energy. In its most general form the air flow in the region of the aperture is described mathematically by Bernoulli's equation, which contains a term for the kinetic energy of the fluid flowing toward the orifice and a second term for the kinetic energy of the fluid flowing away from the orifice. The kinetic energies of the fluid, as expressed in this equation, are each defined by a singles term containing the square of the stream velocity. In practice, the relationship between the kinetic energy of the fluid moving along the centerline of the stream and the kinetic energy of the entire stream is complicated by three factors:

first, if the flow in the conduit is smooth the distribution of velocity across the conduit varies with flow velocity, becoming parabolic (i.e., greatest at the centerline of the conduit at low stream velocities and rather flat (i.e., uniform across the width of the conduit except directly adjacent to the conduit wall) at high velocities, and as a result, the relationship between the pressures measured at the conduit wall and the pressure difference caused by the aperture becomes a function of the stream velocity;

second, the equation assumes that all of the kinetic energy of the fluid is contained in motions directed along smooth pathways and not lost in motions with randomized directions as caused by turbulence (i.e., the effect of the orifice on the measured pressure difference is influenced by the extent of the turbulence in the stream); and, third, the equation does not consider the effects of the momentum of the stream discharged from the orifice. With regard to the latter point, at low velocities, the momentum of a small volume of air is low and allows the air to respond to the radial distributions of pressure within the conduit while traveling a short distance in the direction of the conduit axis. At high velocities, the momentum of that small volume is larger and carries the small volume further in the direction of the conduit axis in comparison with its movement perpendicular to the conduit axis caused by the radial distribution of pressures within the conduit.

As a result of these limitations, the configuration of the airflow measuring device in prior art devices has been altered (1) by carefully shaping the edges of the orifice in the plate in an effort to reduce the amount of turbulence created by the orifice itself;

(2) by replacing the orifice with a nozzle carefully shaped to prevent introducing turbulence in either or both of the upstream and downstream portions of the pipe;

(3) by placement of the wall taps used to measure the pressures at locations carefully selected to minimize the variability of the measured pressures caused by variations in stream momentum or by turbulence caused by the head flowmeter itself;

(4) by introducing multiple aperture devices (such as screens, for example) which break up the air flow at the restriction into a plurality of smaller parallel air streams;

(5) by introducing devices (such as screens, for example) upstream of the flowmeter that are designed to reduce turbulence in the incident stream; and, (6) by correcting the readings of the measuring device by use of a "discharge factor" obtained by careful calibration of the device under different conditions of flow, and by using that discharge factor to provide an empirical correction of the measured data on the assumption that turbulence and other unmeasured properties of the air flow at the time of use are the same as those existing at the time of calibration.

Prior art air flow measuring devices of the foregoing type have used typical screens of the woven mesh type to provide the plurality of restricted orifices across the air flow path, such devices being shown, for example, in U.S. Pat. No. 3,504,542 to Blevins, U.S. Pat. No. 3,626,755 to Rudolph, U.S. Pat. No. 3,797,479 to Graham and U.S. Pat. No. 5,357,972 to Norlien. With woven mesh type screens, however, an air flow problem on the upstream side of the screen is presented since the air flow (particularly at low flow rates) tends to follow the undulations of the weave at the mesh openings. This results in a tendency to create a circular air pattern about each of the openings in the mesh which vary in accordance with the air flow velocities and thereby hinder accurate readings of flow rate over a suitable range.

Other prior art devices have provided elongated tubular configurations (such as those shown in U.S. Pat. No. 3,071,160 to Weichbrod and U.S. Pat. No. 3,838,598 to Tompkins) for the flow restriction, which for various reasons have not proven to be wholly satisfactory.

Finally, flat plate restrictors have been used with multiple spaced orifices such as shown, for example, in U.S. Pat. No. 5,722,417 to Garbe and U.S. Pat. No. 3,129,587 to Hallanger. Such devices have not proven to be easily manufacturable and readily adaptable for use in various environments, such as in the measuring of relatively low air flow in underground conduits for pressurization of telephone cables or the like.

It will also be noted that the measurement of the pressures at the upstream and downstream sides of the restriction will be affected by where (circumferentially) the pressure is measured particularly if there is an uneven velocity distribution across the conduit as, for example, will be the case if the flow measuring device is installed just downstream of the bend in the conduit. Some prior art devices attempted to remedy this problem by providing a plurality of spaced sampling points for determining the upstream and downstream pressures such as shown by the linear tubes extending across the flow path in the aforementioned U.S. Pat. No. 3,129,587 to Hallanger and by the circumferentially spaced parts in the tubular screen holders in the aforementioned U.S. Pat. No. 3,504,542 to Blevins.

SUMMARY OF THE INVENTION

It will be apparent that placing an orifice and plate in a conduit containing air flow affects the direction of flow, the distribution of pressure and the existence of turbulence in both a radial and axial direction and at distances that can be many times the diameter of the orifice or the conduit. It is apparent also that at a point sufficiently distant from the plate and orifice, the direction of flow across the diameter of the conduit is typically parallel to the wall of the conduit and uniform except for the air flowing immediately adjacent to the conduit wall which is affected by the frictional contact therewith. This friction slows down that adjacent air flow, which in turn slows down the flow in a second layer inwardly of the conduit wall toward the longitudinal axis of the conduit. This effect continues as the air flow moves along a path substantially parallel to the axis of the conduit and is evident at a distance from the conduit wall that is affected by the properties of the wall, the velocity of the air stream, and the properties of the incoming air flow. The build-up of this boundary layer is related to the Reynolds Number, a dimensionless number used by aerodynamicists to describe the interactions between a moving fluid and a body immersed in that fluid.

Since these effects are the result of the interaction of an air flow moving in close proximity to a stationary wall, it follows that if, downstream of the orifice by a distance appropriately related to the diameter of the conduit, the wall of the conduit was replaced by an air stream identical to the air stream within the conduit and flowing at the same velocity as the air within the conduit, the effects of friction between the conduit wall and the internal air flow would be eliminated, thereby confining the effects of the aperture and conduit to a region within a few conduit diameters of the aperture. Thus, if the flowing air stream is surrounded on all sides by "guarding" air streams, such as by providing a plurality of spaced uniform orifices across the diameter of the pipe in all directions at uniform spacings, the desired effect can be achieved. The first guarding layer of air streams can be surrounded by a second such layer, the second layer by a third, and this process can be continued to extend over an area many times greater than the area of an individual orifice and surrounding plate. By choosing the size of such a small plate and orifice, surrounding that small plate and orifice by an appropriate number of radially and circumferentially located guarding plates and orifices, and adjusting the diameter of each orifice and the number of such orifices to be placed within a given radius, the combination of plates and orifices can be made to approximate the effects of a single plate and orifice as used in a common head flowmeter. The combination of radially and circumferentially disposed plates and orifices must act essentially like the screens typically used in wind tunnels and pipes to reduce the turbulence existing in the air stream before it enters the sections where measurements are made and must thereby reduce the errors introduced by unpredicted or uncontrolled turbulence, such turbulence typically being the cause of reading errors in head flowmeters.

The multiple aperture and plate design described above will act as a hybrid device simultaneously providing the functions of a smoothing screen to reduce turbulence, a contouring screen to adjust the radial distribution of flow, and a calibrated restriction as required for use with a head flowmeter type of air flow measurement device.

Optimizing the smoothing function in the multiple aperture and plate design described requires that the number of apertures be as large as possible to provide the maximum uniformity across the stream. The number of apertures that can be used, however, is limited by the fact that manufacturing tolerances cause the percentage error in the diameter of the aperture to increase as the diameter of the apertures increases. It is important, therefore, to design a measuring device using "screens" with individual holes whose minimum diameters are consistent with the manufacturing tolerance for those holes and which will provide the accuracy required of the flowmeter. Fortunately that determination is relatively simple.

From data collected on sample screens with different aperture diameters, it has been determined that air at 24.7 psia flowing through a single aperture in a transverse plate closely follows the relationship $$f = 6633 d^2 p^{0.5} \tag{1}$$

where f is the flow in SCFH, d is the diameter of the aperture in inches, and p is the pressure difference between the upstream and downstream side of the plate in psi. If the flow measuring device is to be designed for use at conditions other than 24.7 psia and at standard temperature, the equation should be modified to take these factors into account. From this equation it is evident that, if the pressure is maintained constant, an error in the diameter of the orifice used in the orifice plate causes an error in the indicated flow that is of the same sign and twice as great. Thus, if the objective is to design a screen for a given flow and to avoid errors in the measured flow greater than the fraction e, the diameter of the apertures must be held to a tolerance of e/2. This leads directly to the equation $$d_m = 2x/e \tag{2}$$

where $d_m$ is the minimum aperture diameter consistent with the manufacturing and performance accuracies imposed, x is the manufacturing tolerance on the aperture diameter in inches, and e is the fractional error to be allowed in the indicated flow. This diameter is substituted in the first equation along with the pressure difference desired to obtain the amount of flow, f, through each aperture. The flow through each aperture is then divided into the full-scale flow, F, desired to obtain the number of apertures, N, required.

It is assumed that the screen is formed of circular apertures arranged in a hexagonal pattern, that is, each aperture is surrounded by six similar apertures located at equal distances from the central aperture and sequentially spaced at angles of sixty degrees. For such an arrangement the spacing between apertures is obtained from the equation $$y = 0.67345 D/N \tag{3}$$

where y is the spacing between apertures and D is the diameter of the screen and of the circular channel in which it is placed.

By using the foregoing principles, an air flow measurement device is provided which includes a flat orifice plate having a plurality of uniformly spaced passages of uniform diameter extending therethrough and a pair of cylindrical sleeve units mounting the orifice plate in the appropriate position in the air flow path and within an outer cylindrical connector member. The sleeve units are each provided with circumferentially spaced and radially extending passageways and an outer circumferential groove communicating therewith, and the connector member mounts a pair of valves in communication with the circumferential grooves in the sleeve members so that a differential pressure meter can be attached to the valves to read the pressure difference across the orifice plate and hence determine the air flow therethrough.

The sleeve units can also be conveniently formed of a pair of identical individual sleeves which can be fitted together to form the circumferential groove and which can additionally be used to mount one or more smoothing screens in the device both upstream and downstream of the orifice plate.

BRIEF DESCRIPTION OF THE DRAWINGS

FIG. 1 is a longitudinal section through a conduit utilizing a first embodiment of the air flow measurement device of the present invention.

FIG. 2 is a longitudinal section through a conduit utilizing a second embodiment of the air flow measurement device of the present invention.

FIG. 3 is an enlarged section taken on line 3—3 of FIG. 1.

FIG. 4 is a perspective view of a segment of one of the sleeve members of the air flow measurement device of FIG. 2.

DESCRIPTION OF THE PREFERRED EMBODIMENT

The present invention is particularly designed for measuring relatively low air flows in cylindrical conduits, for example, the measurement of air flow in underground conduits for telephone cables or the like.

FIG. 1 shows a split conduit P which includes, between its split ends, an air flow measurement device 10 embodying the present invention. In accordance with the principles set forth previously, the measurement device 10 is comprised of a cylindrical connector pipe 11 which is securely connected to the separated ends of the conduit P in airtight engagement by means of a pair of securing bands 18. The connector pipe 11 has within its interior a flat circular orifice plate 12 positioned transversely to the flow of air (indicated by the arrow F) through the connector pipe with such plate being provided with a plurality of uniform and uniformly spaced apertures 14 extending therethrough. As shown in FIG. 3, the apertures 14 are uniformly spaced in rows in all directions so that all apertures are equidistant from each other by a center-to-center spacing X (as shown in FIG. 2). The apertures extend in such uniform spacing completely throughout the area of the orifice plate 12 exposed to the air flow to provide both a radially uniform restriction to and appropriately sized individual passages for the air flow F through the conduit and connector pipe. It will also be noted from FIG. 3 that each aperture 14 is surrounded by a hexagon of six equidistant and equally spaced apertures and that this pattern exists at all locations within the entire orifice plate surface exposed to the air flow F.

The orifice plate 12 is arranged to be secured centrally within the connector pipe 11 by means of a pair of cylindrical sleeves 16 which engage the orifice plate at one of their ends while the other of their ends is fitted to one of the split ends of the air flow conduit P. As can be seen from FIGS. 1 and 3, the apertures 14 in the orifice plate extend radially outwardly of the inner walls 17 of the sleeves 16 so that at the sleeve wall-plate face intersection a plurality of partially exposed apertures is presented (FIG. 3). Midway along each of the sleeves 16 and on the outer circumference thereof there is provided a circumferential groove 24, and a plurality of uniformly circumferentially spaced passages 20 connect the interior of each sleeve with the circumferential exterior groove in order to provide appropriate upstream and downstream points for sampling the air flow pressure. A pair of threaded radial passages 28 are provided through the wall of the connector pipe 11 as shown so that they will communicate with the grooves 24 in the sleeves, and a pair of conventional tank valves 26 are threaded into the passages 28. The tank valves may be of the common type used in bicycles or automobile tires wherein a spring-loaded closure maintains the valve closed until a connector is threaded onto the outer end of the valve to release the closure and communicate with the air within the valve.

A conventional differential pressure meter G (FIG. 1) with a pair of threaded connectors 29 may then be selectively connected to the valves 26 to measure the pressure differential between the cross-sectional area of the air flow just upstream and downstream of the restricting orifice plate 12. The meter G can then be appropriately calibrated to provide a measure of the air flow in accordance with the prior discussion.

Although the size and spacing of the apertures 14 may be varied so as to achieve optimal results for a particular fluid flow to be measured, in measuring air flows with the device of the present invention it has been found that with an internal conduit diameter (the diameter of the sleeves 16) of about 0.437 inches, an orifice or aperture diameter of 0.024 inches, and a row-to-row centerline spacing (dimension Y of FIG. 3) of the apertures of 0.055 inches works satisfactorily for air flows from about 0.5–50 standard cubic feet per hour (SCFH).

The plate 12 may be formed of a thin sheet of brass or aluminum with the apertures 14 therethrough being machined by drilling, punching, electroforming, or by means of either laser or chemical milling.

A second embodiment of the invention is shown in FIGS. 2 and 4 of the drawings. As seen in FIG. 2, the air flow measuring device 30 of the present invention is adapted to be placed within the split ends of a conduit P2 in a cylindrical connector pipe 31 as to measure the amount of air flow therein as indicated by the directional flow arrow F. The measurement device 30 is essentially comprised of three screens 32, 34 and 36 spaced along the length of the connector pipe 31 and placed transversely to the flow therethrough. The upstream screen 32, which includes a plurality of uniform and uniformly spaced apertures 33, is a screen designed to smooth the flow of the fluid into a plurality, or bundle, of smaller parallel streams, and the screen 34, which includes a plurality of uniform and uniformly spaced apertures 35, is the orifice plate identical to and performing the same function as the apertured orifice plate 12 of the previously described FIG. 1 embodiment of the invention. The right-hand screen 36, which includes uniform and uniformly spaced apertures 37, functions (in the arrangement of FIG. 2) only as the smoothing screen when the direction of flow F through the connector pipe 11 is reversed.

The construction of the screens 32 and 36 should be essentially like that of the apertured orifice plate 12 of the first described embodiment or the identical screen 34 of the second embodiment, i.e., a smooth, thin, flat-surfaced plate with uniformly spaced apertures or passages extending therethrough. In order to minimize the total pressure drop across the device it may be necessary to insure that the pressure drop across the smoothing screen, 32 or 36, is not too great. Thus, with the orifice plate 34 having apertures arranged the same as those of the plate 12 of the FIG. 1 embodiment, it may be necessary that the percentage of aperture-to-total plate area be significantly greater in the smoothing screens 32, 36 (this is indicated by the greater number of apertures appearing in the cross-section of screens 32 and 36 in FIG. 2 of the drawings).

The screens, or plates, 32, 34 and 36 are held in place within the connector pipe 31 by means of six identically constructed cylindrical sleeves 40a, 40b, 40c, 40d, 40e and 40f arranged as shown in FIG. 2. Each of the inserts 40, a segment of which is shown in the perspective view of FIG. 4, includes a chamfered surface 44 (for a purpose to be explained hereinafter) and a plurality of grooves 42 extending from the chamfered surface 44 to the surface 45 of the segment, that surface forming a portion of the inner wall of the passage through the device—as shown in FIG. 2. Each sleeve 40, in the described embodiment, includes eight grooves 42 uniformly angularly spaced about the inner circumference of the sleeve at one end wall thereof (i.e., grooves 42 will be spaced 60 degrees apart about the sleeve in the direction R as shown in FIG. 4).

From FIG. 2 it will be noted that the connector pipe 31 is provided with a pair of threaded radially extending passages 50 spaced just upstream and downstream of the orifice plate 34. These passages 50 provide the means for connecting the internal air flow pressures to the tank valves 26 (only partially shown) and differential pressure measuring device (not shown) in precisely the same manner as the passages 28 of the FIG. 1 embodiment of the invention. It will be understood that the tank valves 26 are identical to the previously described tank valves 26 of the FIG. 1 embodiment and that a differential pressure meter (not shown) may be appropriately connected to the tank valves 26 in the same manner as shown in the FIG. 1 embodiment. As can be seen from FIG. 2, the innermost sleeves 40c and 40d are positioned so that the chamfered surfaces 44 thereof face away from the orifice plate 34 and mate with the passages 50 in the connector pipe 31. The next two sleeves 40b and 40e are pushed against sleeves 40c and 40d, respectively, so that the chamfered edges 44 thereof mate to provide a pair of v-shaped grooves 46 and 48, as shown, extending completely about the inner circumference of the connector pipe 31 and mating with the passages 50. The radially extending V-shaped grooves 42 connect with the larger grooves 46 and 48 and, as can be seen, connect the interior of the air flow passage to the external pressure measuring device at a plurality of angularly spaced locations about the inner circumference of the connector pipe.

While the FIG. 2 embodiment of the invention shows the grooves on the adjacent sleeves 40b/40c and 40d/40e to be matched (thus producing eight radial passages 42 about the circumference), it will be evident that one of each pair of sleeves could be rotated relative to the adjacent sleeve so as to produce sixteen angularly spaced passages about the inner circumference of the connector pipe with each passage being, of course, of only half the volume of the mating passages 42 as shown in FIG. 2.

The outermost sleeves 40a and 40f are placed in abutment with the smoothing screens 32 and 36 to hold the entire arrangement in place with the chamfered edges thereof facing outwardly as shown to provide a pair of cylindrical grooves 52 and 54 which can be filled with a suitable sealing material to rigidly fix the entire structure within the connector pipe 31 in an airtight arrangement.

The sleeves 40 may be formed of metal or plastic, and it will be recognized that the fact that they are all identical in construction will reduce the manufacturing costs. The notches 42 on the sleeves typically may be formed at about 0.02 inches in depth, and, obviously, they may be of any easily manufacturable cross-sectional shape other than the triangular shape shown.

In order to maintain the flow passage through the conduit P2 and flow measuring device 30 at a constant diameter so that turbulence is not created by a change of diameter near the orifice plate 34, the connector pipe 31 is made just long enough to terminate at the outer ends of the outer sleeves 40a and 40f where they abut against the split ends of the conduit P2, it being noted that the diameter of the flow passage through device 30 (the inner circumferential wall 45 of sleeves 40) matches the inner diameter of the conduit P2. The connector pipe 31 may be securely attached to the conduit P2 ends in airtight engagement by any conventional means such as the bands 56 as shown.

It is also to be noted from the earlier discussion related to minimizing the size of the individual orifice plate apertures, that it is the objective of this invention to provide an orifice plate 12 or 34 providing the maximum number of apertures and which will allow the most uniform distribution of closed areas in that aperture plate. This approach provides the maximum smoothing effect by the orifice plate and provides minimal sensitivity of the measured pressure to the relative location of the orifice plate (12 or 34) and the conduit wall pressure sensing orifices (20 and 42). If the ratio of the combined area of all of the orifices in the orifice plate to the total area of the orifice plate exposed to the air flow becomes larger than about one-fourth, and, if the invention is to be used to measure air flow with extremely large variations in cross-sectional profile, the arrangement shown in FIG. 2 including a smoothing screen on the upstream side of the orifice plate is to be preferred.

Although the best modes contemplated for carrying out the present invention have been herein shown and described, it will be apparent that other modifications and variations may be made without departing from what is regarded to be the subject matter of the invention.

What is claimed is:

1. An air flow measurement device for measuring air flow within a cylindrical conduit comprising a cylindrical connector for connecting the air flow between spaced ends of said cylindrical conduit, a flat orifice plate having a plurality of uniformly spaced passages of uniform diameter extending therethrough, a pair of cylindrical sleeve units for tightly securing said orifice plate therebetween and for airtight securement within said cylindrical connector so that said orifice plate is positioned at a right angle to the air flow through the conduit, each of the sleeve units including a plurality of circumferentially spaced and radially extending passageways adapted to communicate with the air in the conduit on one of the upstream and downstream sides of said orifice plate, each of the sleeve units further including a circumferential groove extending about the outer circumference of the unit for communication with said respective radially extending passageways, and a pair of spaced valves mounted upon and extending through the wall of the connector so as to communicate respectively with the circumferential grooves of the sleeve units, said valves being arranged to be coupled to a differential pressure meter for determining the pressure difference across said orifice plate in order to determine the air flow therethrough.

2. An air flow measurement device according to claim 1 including a flow control plate mounted within said connector at the opposite end of one of the sleeve units from the end thereof which secures the orifice plate, said flow control plate having a plurality of uniformly spaced passages extending therethrough, said flow control plate having a percentage of open area designed to smooth out non-uniformities of flow across the connector, and means for securing the flow control plate within the connector.

3. An air flow measurement device according to claim 2 wherein said means for securing comprises an outer cylindrical sleeve having an internal diameter matching that of the sleeve units so that a smooth air flow is maintained through the device.

4. An air flow measurement device according to claim 1 including a pair of flow control plates mounted within said connector at the opposite ends of the sleeve units from the ends thereof which secure said orifice plate, said flow control plates having a plurality of uniformly spaced passages extending therethrough with said flow control plates having a percentage of open area designed to permit the air flow to move freely therethrough while smoothing out non-uniformities of flow across the connector, and means for securing the flow control plates within the connector.

5. An air flow measurement device according to claim 4 wherein said means for securing comprises a pair of outer cylindrical sleeves each having internal diameters matching that of the sleeve units so that a smooth air flow is maintained through the device.

6. An air flow measurement device according to claim 1 wherein said passages in the orifice plate are uniformly spaced of the orifice plate completely throughout that portion thereof exposed to said air flow so that the passages are located radially outwardly from a centerline of the orifice plate and past the inner diameters of the sleeve units whereby a plurality of partially blocked passages are provided at the circumferential intersections of the sleeves and the orifice plate.

7. An air flow measurement device according to claim 1 wherein each of said sleeve units comprises a pair of identical cylindrical sleeve members, each sleeve member including at one end thereof a plurality of radially extending passageways and an inclined cylindrical end surface communicating with said passageways, said sleeve members being placed in abutment to form said sleeve unit with said inclined surfaces being juxtaposed to form said circumferential groove in the sleeve unit.

8. An air flow measurement device according to claim 7 including a flow control plate, said flow control plate having a plurality of uniformly spaced passages extending therethrough, and a further sleeve member securing said flow control plate within said connector and in abutment with the upstream end of the sleeve unit on the upstream end of said orifice plate.

9. An air flow measurement device according to claim 1 wherein the ratio of the combined areas of the passages in said orifice plate to the total area of the orifice plate exposed to the air flow is not greater than about one-fourth.

10. An air flow measurement device for measuring air flow within a cylindrical conduit comprising
a cylindrical connector for connecting the air flow between spaced ends of said cylindrical conduit,
an orifice plate having a plurality of uniformly spaced passageways of uniform diameter extending therethrough,
a plurality of identical cylindrical sleeve members including first and second sleeve members having first cylindrical ends for tightly securing said orifice plate therebetween and for airtight securement within said cylindrical connector, each of said first and second sleeve members having a second cylindrical end which includes a cylindrical inclined surface at the outer diameter thereof and a plurality of circumferentially spaced and radially extending passageways connecting the inner diameter thereof with said inclined surface, third and fourth cylindrical sleeve members identical to said first and second sleeve members secured within said connector so that the second cylindrical ends thereof abut the second cylindrical ends of said first and second sleeve members whereby said inclined surfaces of the sleeve members form a pair of circumferential grooves directly adjacent to the inner diameter of the connector spaced upstream and downstream of said orifice plate,
and a pair of spaced valves mounted upon and extending through the wall of the connector so as to communicate respectively with said circumferential grooves, said valves being arranged to be coupled to a differential pressure meter for determining the pressure difference across said orifice plate in order to determine the air flow therethrough.

11. An air flow measurement device according to claim 10 including a flow control plate, said flow control plate having a plurality uniformly spaced passages extending therethrough, and a fifth sleeve member identical to the other sleeve members securing said flow control plate within said connector and in abutment with the upstream end of the third sleeve member on the upstream side of said orifice plate.

12. An air flow measurement device according to claim 10 wherein the ratio of the combined areas of the passages in said orifice plate to the total area exposed to the air flow is not greater than about one-fourth.

* * * * *